Figure 1:
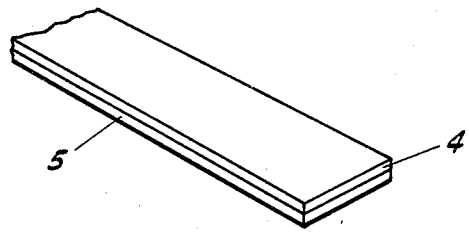

Feb. 12, 1957  K. E. POLMANTEER  2,781,288
LAMINATED RUBBER ARTICLE AND A METHOD OF MAKING SAME
Filed Aug. 30, 1954

INVENTOR.
KEITH E. POLMANTEER
BY Robert F. Fleming Jr

ATTORNEY

United States Patent Office 2,781,288
Patented Feb. 12, 1957

2,781,288

LAMINATED RUBBER ARTICLE AND A METHOD OF MAKING SAME

Keith E. Polmanteer, Midland, Mich., assignor to Dow Corning Corporation, Midland, Mich., a corporation of Michigan Application August 30, 1954, Serial No. 452,802

10 Claims. (Cl. 154—139)

This invention relates to an article of manufacture comprising alternate layers of an organic rubber and organosilicon rubber.

The superiority of organosilicon rubbers over organic rubbers with respect to thermal stability, resistance to weathering and chemical reagents is well known. On the other hand, the superiority of organic rubbers to organosilicon rubbers with respect to stress-strain properties and resistance to certain solvents together with the greatly reduced cost of the organic rubber is also well known. For this reason there are many applications in which it would be desirable to fabricate articles partly from organosilicon rubbers and partly from organic rubber. By so doing it is possible to take advantage of the superior physical and/or chemical properties of each material and at the same time produce an article at less cost than with organosilicon rubber alone. To date, however, no commercially satisfactory articles comprising alternate layers of organosilicon and organic rubbers have been available. This has been due primarily to the fact that there was no satisfactory way of bonding the two materials together.

It is a primary object of the present invention to provide articles of manufacture which comprise alternate layers of bonded silicone and organic rubbers. Another object is to produce superior elastomeric articles with respect to weatherability, chemical inertness, thermal stability and cheapness. Other objects and advantages will be apparent from the following description.

This invention relates to articles of manufacture comprising alternate covulcanized layers of an organic rubber and an alkenyl polysiloxane rubber in which at least .01 mol percent of the polymer units have at least 1 alkenyl radical attached to the silicon atom.

The articles of this invention are made by laminating alternate layers of an organic rubber polymer in which at least .5 mol percent of the polymer units have residual C=C unsaturation and an alkenyl polysiloxane in which at least .01 mol percent of the polymer units have at least one alkenyl radical attached to the silicon atom, and any remaining organic radicals in the siloxane being of the group saturated aliphatic hydrocarbon radicals, aryl hydrocarbon radicals and halogenated monovalent hydrocarbon radicals, there being on the average a total of from 1.9 to 2.1 organic radicals per silicon atom, each of said layers containing at least .5% by weight based on the total weight of the respective polymers of a vulcanizing agent of the group sulfur and certain sulfur compounds and thereafter heating the laminated material until a unitary covulcanized mass is obtained.

Figure 2:
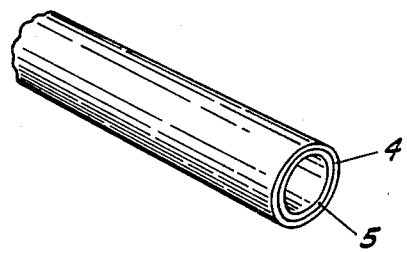
Figure 3:
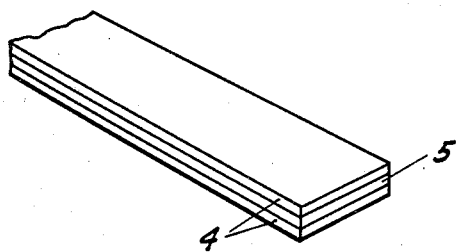

During the heating of the above laminate each individual layer is vulcanized and the respective layers are vulcanized to each other thereby forming a permanent bond between the respective layers. The resulting article comprises alternate permanently bonded layers of silicone rubber and organic rubber as is shown in the accompanying drawing in which:

Fig. 1 is a perspective view of a laminate comprising two layers;
Fig. 2 is a perspective view of a tubular laminate; and
Fig. 3 is a perspective view of a laminate having three layers.

In each of the drawings, layer 4 represents the organosilicon rubber and 5 represents the organic rubber. It should be understood, of course, that any number of alternate layers in any arrangement can be made without departing from the scope of this invention.

The lamination of the various layers may be carried out in any convenient manner. For example, the organosilicon and organic rubber polymers may be compounded with a vulcanizing agent and if desired, fillers, and thereafter sheeted and the respective sheets stacked and vulcanized. Alternatively, the respective layers may be extruded over each other through concentric dies to produce either flat or tubular articles. Instead of employing concentric dies where all layers are extruded simultaneously one may extrude the inner layer or layers and partially vulcanize them and thereafter extrude the outer layers over the partially vulcanized inner layer or layers and subsequently completely vulcanize the article into a unitary whole. Another method of fabricating the articles is to dip coat a base member or a partially vulcanized layer into successive solutions of the organosilicon polymer and the organic rubber polymer thereby building up successive alternate layers of the two materials. The resulting article can then be completely vulcanized to fuse the layers into a unitary whole.

If desired, the articles of this invention may contain reinforcing fabrics either between or included in the various layers. These fabrics may be of any suitable materials such as organic fabrics such as cotton, nylon and the like or inorganic fabrics such as glass cloth, and metallic wire mesh.

The vulcanization of the articles of this invention may be carried out at any desired temperature. Suitable temperatures range from 30° C. to 200° C. and up. It is often desirable to carry out the vulcanization above atmospheric pressure in order to assist in fusing the layers and in order to suppress bubbling. However, satisfactory cures can be carried out at atmospheric pressure particularly with thin layers.

The organic rubber polymers which are suitable for use in this invention are those in which at least .5 mol percent of the polymer units contain residual unsaturation. Such polymers are derived by polymerizing any diene such as for example butadiene, dimethylbutadiene, isoprene, chloroprene or by copolymerizing two or more dienes. When the polymer is composed entirely of units derived from dienes there will be theoretically one unsaturated linkage per monomer unit. The organic rubber polymers within the scope of this invention can also be copolymers of any diene with any vinylic compound provided the resulting copolymer has the required amount of residual unsaturation. For example, the copolymer can be made by copolymerizing as little as .5 mol percent of a diene with 99.5 mol percent of a vinylic compound.

The term "vinylic compound" as employed herein includes any compound having 1 C=C linkage in the molecule. Specific examples of vinylic compounds which can be included in the organic rubber copolymers are isobutylene, styrene, acrylonitrile, methylacrylate, vinylchloride, vinylidene chloride, vinyl acetate, vinyl carbazole, coumarone, indene and vinyl toluene.

These organic rubber polymers may be prepared by any of the well-known commercial methods for making them.

The organopolysiloxanes employed in this invention are composed essentially of diorganosiloxane units. However, the siloxanes can contain limited amounts of monoorganosiloxane and triorganosiloxane units provided the average total number of organic radicals to silicon is from 1.9 to 2.1. Thus, the siloxanes of this invention may be composed of combinations of siloxane units of the formula $RSiO_{1.5}$, $R_2SiO$, $R_3SiO_{.5}$, $RR'SiO$, $R_2R'SiO_{.5}$, $RR'_2SiO_{.5}$, $R'SiO_{1.5}$, $R'_2SiO$ and $R'_3SiO_{.5}$ provided the siloxane has the required mol percent alkenyl siloxane and the required total number of organic radicals.

For the purpose of this invention R can be any alkenyl radical such as for example vinyl, allyl, heptenyl and octadecenyl and R' can be any saturated aliphatic hydrocarbon radical such as alkyl radicals such as methyl, ethyl, butyl, and octadecyl; cycloaliphatic radicals such as cyclohexyl; any aromatic hydrocarbon radical such as phenyl, tolyl and xenyl and any halogenated monovalent hydrocarbon radical such as pentafluoroethyl, dichlorophenyl, trifluorovinyl, heptachloroxenyl, dibromophenyl,

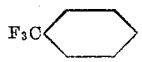

and chlorocyclohexyl.

The preferred species of siloxane employed herein are those in which essentially all of the siloxane units are of the formula $RR'SiO$ and $R'_2SiO$ in which R' is methyl and phenyl. In such elastomers it is preferred that the alkenyl siloxane be present in amount from .01 to 10 mol percent.

The physical state of the siloxanes employed herein is not critical since they can range from thin fluids to non-flowing solids.

The vulcanizing agents employed in this invention are sulfur, certain sulfur compounds and combinations of sulfur with these compounds. The sulfur compounds which may be used alone or in combination with each other or in combination with sulfur are: thiurammonosulfides, thiuramdisulfides, thiuramtetrasulfides, salts of dithiocarbamic acids, xanthates, xanthogen disulfides and benzothiazyl derivatives of the formula

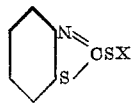

where X is hydrogen, a metal or the radical

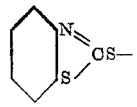

Specific examples of the sulfur compounds which can be employed as vulcanizing agents are by class benzothiazyl derivatives such as 2-mercaptobenzothiazole, 2,2'-benzothiazyldisulfide and zinc benzothiazylsulfide; thiurammonosulfides such as tetraalkylthiurammonosulfides such as tetramethylthiurammonosulfide, tetraoctadecylthiurammonosulfide, and cycloalkylenethiurammonosulfides such as di-N-pentamethylenethiurammonosulfide; thiuramdisulfides such as tetraalkylthiuramdisulfides such as tetramethylthiuramdisulfide and tetraoctadecylthiuramdisulfide and cycloalkylenethiuramdisulfides such as di-N-pentamethylenethiuramdisulfide; thiuramtetrasulfides such as tetraalkylthiuramtetrasulfides such as tetramethylthiuramtetrasulfide and tetrabutylthiuramtetrasulfide and cycloalkylenethiuramtetrasulfides such as di-N-pentamethylenethiuramtetrasulfide; salts of dithiocarbamic acids such as piperidinium-N-pentamethylenedithiocarbamate, and metal salts of the formula

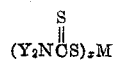

where Y is for example methyl, ethyl, butyl, benzyl and phenyl, M is for example zinc, lead, copper, bismuth, selenium and tellurium and x is an integer equal to the valence of the metal; xanthates such as zinc butylxanthate, lead ethylxanthate and copper methylxanthate; and xanthogendisulfides such as dibutylxanthogendisulfide, diethylxanthogendisulfide and dimethylxanthogendisulfide.

In all cases the total amount of vulcanizing agent should be at least .5% by weight based on the weight of the respective organic rubber and organosilicon polymer. The upper limit of the amount of vulcanizing agent is not critical but in general amounts less than 10% by weight are employed.

If desired, fillers may be employed in both the organic rubber and the organosilicon polymers employed in this invention. Typical fillers include metal oxides such as titania, zinc oxide, ferric oxide and chromic oxide; siliceous materials such as glass fibers, clay, diatomaceous earth, crushed quartz, silica aerogels, fume silicas and silica xerogels; carbon black and organic fillers such as wood flour, cotton linters, cork and the like.

If desired, the fillers employed especially the silica fillers can be treated with organochlorosilanes or other organosilicon compounds by any of the methods shown in the art.

In addition to fillers, the articles of this invention may contain compression set additives; oxidation inhibitors; pigments; activators such as zinc oxide, fatty acids, litharge, magnesium oxide and metallic selenium; accelerators such as the condensation products of aldehydes with ammonia or organic amines such as hexamethylenetetraamine, butyraldehyde-aniline, butyraldehyde-monobutylamine, formaldehyde-aniline, acetaldehyde-aniline, heptaldehyde-aniline and formaldehyde-p-toluidine, and substituted guanidines such as dipenhylguanidine, di-o-tolylguanidine, and triphenylguanidine; and other additives which are normally employed in siloxane and organic elastomers.

In preparing the organosilicon rubber polymer and the organic rubber polymer for lamination, it is preferable that each be mixed thoroughly with the desired vulcanizing agents and any desired fillers or other additives. This mixing may be accomplished by any conventional means such as on a mill or in a rotating blade mixer.

The products of this invention are particularly useful in those applications where it is desirable to protect organic rubbers from the effect of oxidation due to elevated temperatures, ozone deterioration, and chemical reagents. For example, the sidewalls of tires can be composed of a layer of a silicone rubber vulcanized to an inner layer of an organic rubber. This would protect the sidewalls from the effects of weather and prevent checking. The same principle could be applied to gasketing such as those used around windshields, oven doors, aircraft openings and the like. The articles of this invention may also be employed in the manufacture of tires by coating the cords of the tire with silicone rubber and making the remainder of the tire from organic rubber. The silicone rubber would thereby be able to withstand excessive temperature in the interior of the tire better than organic rubber therby prolonging the life and safety of the tire.

The process and articles of this invention are also useful in coating of wire and other conductors whereby it is desirable to protect the elastomer from the effects of exterior phenomena. This would be particularly adaptable for the insulation of electrical conductors which are subjected to severe weathering conditions. Another specific use for which these articles are particularly suitable is for the cover of rolls wherein there is a release problem. By applying a layer of silicone rubber over the organic rubber on the roll, the release of plastic and organic rubber articles is greatly facilitated. At the same time the rolls would be less affected by plasticizers and other chemicals normally found in organic plastics.

The following examples illustrate the preparation of the articles of this invention but it should be understood that the invention is no way limited thereto but is properly defined in the appended claims.

Example 1

100 parts by weight of smoked sheet natural rubber was milled with 30 parts by weight of a powdered silica, 1.35 parts by weight sulfur, 1.3 parts by weight of selenium diethyldithiocarbamate and 1 part by weight of mercaptobenzothiazole and then pressed into a sheet.

100 parts by weight of a copolymer gum composed of 96 mol percent dimethylsiloxane and 4 mol percent vinylmethylsiloxane were milled with identical amounts of the filler and vulcanizing agents and thereafter pressed into a sheet. The two sheets were then placed together in a press and heated 30 minutes at 140° C. whereupon the respective sheets were bonded together in a unitary mass.

Example 2

A copolymer of 97.5 mol percent isobutylene and 2.5 mol percent isoprene and a copolymer gum of 8 mol percent methylvinylsiloxane and 92 mol percent dimethylsiloxane were each milled separately with 40 parts by weight of a powdered silica, 3 parts by weight zinc oxide, 2 parts by weight sulfur, 2 parts by weight selenium diethyldithiocarbamate and 1 part by weight mercaptobenzothiazole all based on 100 parts by weight of the polymers. Each mixture was then pressed into a sheet. The two sheets were then placed together in a press and heated 30 minutes at 140° C. whereupon the two layers became bonded into a unitary mass.

Example 3

Equivalent results were obtained when 100 parts by weight of a copolymer of 23.5 mol percent styrene and 76.5 mol percent butadiene is employed in the method of Example 1.

Example 4

When 100 parts by weight of a copolymer of 35 mol percent acrylonitrile and 65 mol percent butadiene and 100 parts by weight of a copolymer gum of 1 mol percent methylvinylsiloxane and 99 mol percent dimethylsiloxane are each milled separately with 80 parts by weight diatomaceous earth, 4 parts by weight sulfur, 2 parts by weight selenium diethyldithiocarbamate and 2 parts by weight mercaptobenzothiazole and thereafter pressed into a sheet and the resulting sheets are placed together in a press and heated 30 minutes at 150° C., the two layers are bonded into a unitary mass.

Example 5

Equivalent results are obtained when the procedure of Example 3 is repeated except that the vulcanizing agents employed were 4 parts by weight selenium diethylthiocarbamate and 2 parts by weight mercaptobenzothiazole.

Example 6

Equivalent results are obtained when a copolymer of 10 mol percent phenylvinylsiloxane and 5 mol percent diphenylsiloxane and 85 mol percent dimethylsiloxane is employed in the process of Example 1.

Example 7

Equivalent results are obtained when the procedure of Example 1 is repeated except that the vulcanizing agents employed are 2 parts by weight sulfur and 2 parts by weight of any one of the compounds listed below:

2,2'-benzothiazyldisulfide,
Zinc benzothiazylsulfide,
Tetramethylthiurammonosulfide,
Di-N-pentamethylenethiuramtetrasulfide,
Tetraethylthiuramdisulfide,
Piperidinium-N-pentamethylenedithiocarbamate,
Zinc dibenzyldithiocarbamate,
Bismuth dimethyldithiocarbamate,
Lead dimethyldithiocarbamate,
Tellurium diethyldithiocarbamate,
Zinc dibutyldithiocarbamate,
Zinc butylxanthate, and
Dibutylxanthogendisulfide.

That which is claimed is:

1. The method of preparing an article of manufacture which comprises laminating alternate layers of an organic rubber polymer in which at least .5 mol percent of the polymer units have residual C=C unsaturation and an alkenyl polysiloxane in which at least .01 mol percent of the polymer units have at least 1 alkenyl radical attached to the silicon atom, any remaining organic radicals in the siloxane being of the group consisting of saturated aliphatic hydrocarbon radicals, aryl hydrocarbon radicals and halogenated monovalent hydrocarbon radicals, in said siloxane there being on the average a total of from 1.9 to 2.1 organic radicals per silicon atom, each of said layers containing at least .5% by weight based on the weight of the respective polymers of a vulcanizing agent of the group consisting of sulfur, thiurammonosulfides, thiuramdisulfides, thiuramtetrasulfides, salts of dithiocarbamic acids, xanthates, xanthogendisulfides and benzothiazyl derivatives of the formula

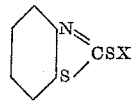

where X is of the group consisting of hydrogen, metals and the radical

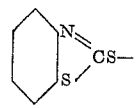

and thereafter heating the laminate until it vulcanizes into a unitary mass.

2. A method of preparing an article of manufacture which comprises laminating alternate layers of an organic rubber polymer in which at least .5 mol percent of the polymer units have residual C=C unsaturation and a polysiloxane in which from .01 to 10 mol percent of the units are of the formula RR'SiO, the remaining siloxane units being essentially all of the formula R'$_2$SiO in which R is an alkenyl radical and R' is selected from the group consisting of saturated aliphatic hydrocarbon radicals, aryl hydrocarbon radicals and halogenated monovalent hydrocarbon radicals, each of said layers containing at least .5% by weight of the polymer of a vulcanizing agent of the group consisting of sulfur, thiurammonosulfides, thiuramdisulfides, thiuramtetrasulfides, salts of dithiocarbamic acids, xanthates, xanthogendisulfides and benzothiazyl derivatives of the formula

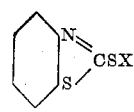

where X is of the group consisting of hydrogen, metals and the radical

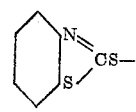

and thereafter heating the laminate until a unitary mass is obtained.

3. The method in accordance with claim 2 in which the siloxane is a copolymer of from .01 to 10 mol percent methylvinylsiloxane, the remainder being dimethylsiloxane.

4. The method in accordance with claim 2 in which the siloxane is a copolymer of from .01 to 10 mol percent methylvinylsiloxane, the remainder being a phenylmethylsiloxane.

5. An article of manufacture comprising alternate covulcanized layers of an organic rubber polymer in which at least .5 mol percent of the polymer units have residual C=C unsaturation and an alkenylpolysiloxane in which at least .01 mol percent of the polymer units have at least 1 alkenyl radical attached to the silicon atom and any remaining organic groups in the siloxane being selected from the group consisting of saturated aliphatic hydrocarbon radicals, aryl hydrocarbon radicals and halogenated monovalent hydrocarbon radicals, in said siloxane there being on the average a total of from 1.9 to 2.1 organic radicals per silicon atom.

6. An article of manufacture comprising alternate covulcanized layers of an organic rubber polymer in which at least .5 mol percent of the polymer units have residual C=C unsaturation and a polysiloxane in which from .01 to 10 mol percent of the siloxane units are of the formula RR'SiO, essentially all of the remaining siloxane units being of the formula R'₂SiO in which R is an alkenyl radical and R' is selected from the group consisting of saturated aliphatic hydrocarbon radicals, aryl hydrocarbon radicals and halogenated monovalent hydrocarbon radicals.

7. An article of manufacture in accordance with claim 6 in which the siloxane is a copolymer of from .01 to 10 mol percent methylvinylsiloxane, the remainder being dimethylsiloxane.

8. An article of manufacture in accordance with claim 6 in which the siloxane is a copolymer of from .01 to 10 mol percent methylvinylsiloxane, the remainder being a methylphenylsiloxane.

9. An article of manufacture in accordance with claim 6 in which the siloxane is a copolymer of from .01 to 10 mol percent phenylvinylsiloxane, the remainder being dimethylsiloxane.

10. An article of manufacture in accordance with claim 6 in which the siloxane is a copolymer of from .01 to 10 mol percent phenylvinylsiloxane, the remainder being a methylphenylsiloxane.

References Cited in the file of this patent

UNITED STATES PATENTS

| | | |
|---|---|---|
| 2,439,689 | Hyde | Apr. 13, 1948 |
| 2,475,122 | Barry et al. | July 5, 1949 |
| 2,525,070 | Greenwald et al. | Oct. 10, 1950 |
| 2,601,336 | Smith-Johannsen | June 24, 1952 |
| 2,601,337 | Smith-Johannsen | June 24, 1952 |
| 2,639,276 | Smith-Johannsen | May 19, 1953 |
| 2,643,964 | Smith-Johannsen | June 30, 1953 |